W. M. CHAPMAN.
SIGNAL CONTROLLING APPARATUS.
APPLICATION FILED APR. 25, 1908.
942,195.
Patented Dec. 7, 1909.
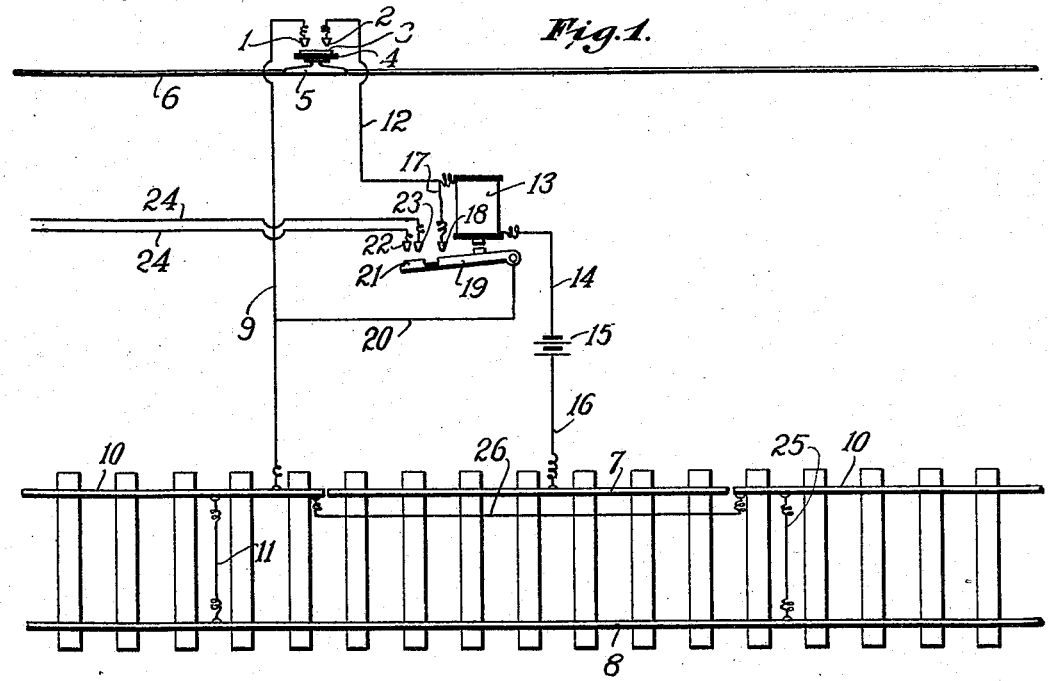
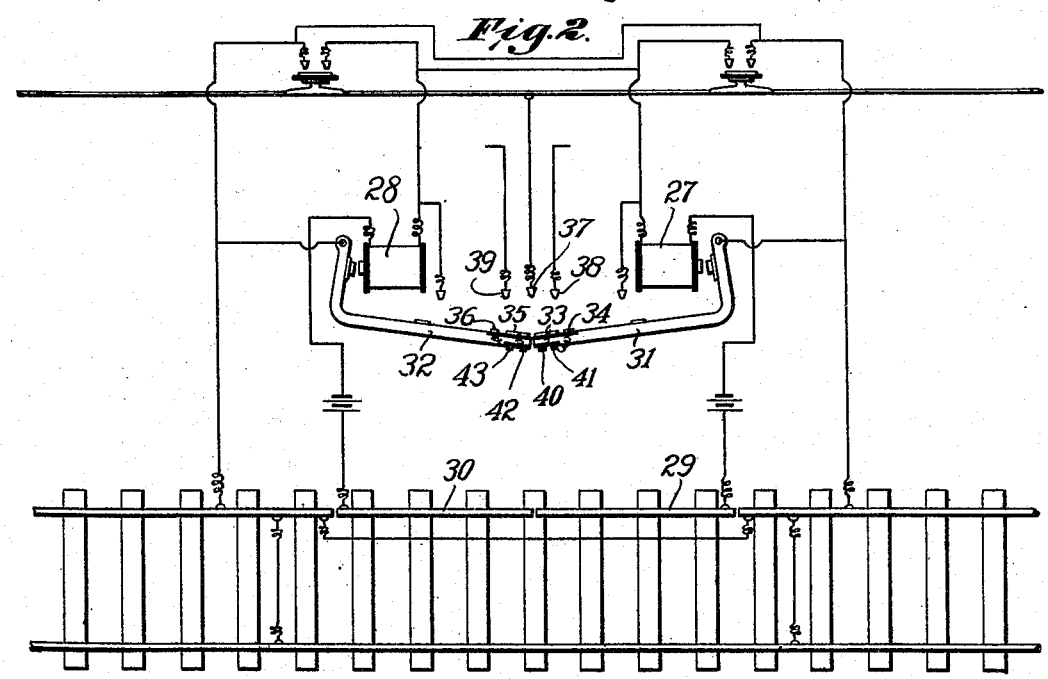
Witnesses:
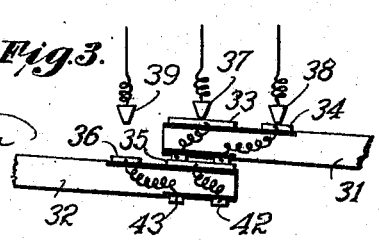
Inventor:
Winthrop M. Chapman
by his Attorneys
Phillips Van Everen & Fish

UNITED STATES PATENT OFFICE.

WINTHROP M. CHAPMAN, OF NEEDHAM, MASSACHUSETTS, ASSIGNOR TO ELECTRIC-RAILWAY SIGNAL COMPANY, OF KITTERY, MAINE, A CORPORATION OF MAINE.

SIGNAL-CONTROLLING APPARATUS.

942,195.  Specification of Letters Patent.  Patented Dec. 7, 1909.

Application filed April 25, 1908. Serial No. 429,178.

*To all whom it may concern:*

Be it known that I, WINTHROP M. CHAPMAN, a citizen of the United States, residing at Needham, in the county of Norfolk and State of Massachusetts, have invented certain new and useful Improvements in Signal-Controlling Apparatus, and do hereby declare the following to be a full, clear, and exact description of the invention, such as will enable others skilled in the art to which it appertains to make and use the same.

The present invention relates particularly to signal controlling apparatus for use in connection with the block signal systems of electric trolley roads, although certain features of the invention are adapted for use in other relations.

The object of the present invention is to produce a signal controlling apparatus of improved construction and mode of operation, and with this object in view the invention consists in the combinations and arrangements, of parts, circuit connections and contacts hereinafter described and claimed, the advantages of which will be pointed out in the following description or will be obvious to those skilled in the art.

The preferred forms of the several features of the present invention are illustrated in the accompanying drawing in which—

Figure 1 is a diagrammatic view of a signal controlling apparatus designed particularly to control the operation of a signal for cars passing in one direction; Fig. 2 is a diagrammatic view of a signal controlling apparatus designed particularly for controlling the operation of signals for cars passing in both directions; and Fig. 3 is a detail view, on an enlarged scale, of a portion of the mechanism indicated in Fig. 2.

The essential novel features of the apparatus illustrated in Fig. 1 are a set of contacts arranged to be closed by the trolley of an electric car, another set of contacts arranged to be closed by the wheels of the car, and a signal controlling circuit which is closed by the closure of both sets of contacts.

The contacts which are closed by the trolley are indicated at 1 and 2, and are arranged above a conducting strip 3 mounted upon an insulating block or strip 4 which in turn is mounted upon a support 5 secured directly to the trolley wire 6. The support 5 is so arranged with relation to the contacts 1 and 2 that normally the strip is 3 is out of engagement with the contacts and consequently the contacts are open. Upon the passage of an electric car, however, the trolley wire 6, together with the support 5, is raised by the trolley, and the contacts are closed by the engagement therewith of the strip 3. The other set of contacts, which are closed by the wheels of the car, consists of an insulated section of rail 7 and the opposite rail 8 of the track upon which the car travels, these contacts, as will be obvious, being bridged or closed so long as a car remains upon the insulated section.

In the arrangement illustrated in Fig. 1 the signal controlling circuit includes both sets of contacts in series, the contact 1 being connected by a wire 9 to the rail 10 of the track which is connected by a wire 11 to the rail 8, and the contact 2 being connected by a wire 12 to one terminal of a magnet 13, the other terminal of which is connected by a wire 14, battery 15, and wire 16 to the insulated section of rail 7.

Since the two sets of contacts are included in the signal controlling circuit in series, it will be obvious that the circuit can be closed only by the closure of both sets of contacts, which closure occurs when a car passes on to the insulated section of track, the contacts 1 and 2 being bridged by the elevation of the trolley wire which brings the strip 3 into engagement with the contacts 1 and 2, and the contacts 7 and 8 being bridged by the wheels of the car.

By the provision of two sets of contacts, closed respectively by the trolley wheel and the wheels of the car, absolute certainty of operation of the signal controlled by the signal controlling circuit is insured, since the circuit cannot be accidentally or maliciously closed by the grounding of the insulated section of rail or connecting it to the opposite rail or to the rail at either end of the section, nor can the circuit be closed by a malicious closure of the contacts 1 and 2, or by the accidental closure of these contacts while the car is at a distance from the insulated section, all of which disadvantages are incident to circuit controlling apparatus heretofore devised.

It is desirable in apparatus of the character to which the present invention relates, that the signal controlling circuit be closed but once during the passage of a car, in order that the signal controlled by the circuit may be properly actuated. It is also desirable to be able to keep the signal controlling circuit closed during the passage of a number of cars, so that the signal may be properly actuated when a number of cars are run as a train. To secure these results, means are provided in the apparatus illustrated in Fig. 1 for maintaining the signal controlling circuit closed so long as the wheels of a car remain upon the insulated section, regardless of whether the contacts 1 and 2 are kept closed or not. To this end the wire 12 is connected by a wire 17 to a contact 18, which is arranged to be engaged by the armature 19 of the magnet 13 when the magnet is energized, and the armature is connected by a wire 20 to the wire 9. By means of this arrangement, as soon as the signal controlling circuit is closed by the closure of both sets of contacts 1—2 and 7—8, the contacts 1 and 2 are shunted, and thereafter the circuit through the magnet 13 is kept closed until the contacts 7 and 8 are opened by the passage of the car or cars from the insulated section of track.

The signal controlling circuit controls a signal by means of the magnet 13 and its armature 19, the armature being provided with an insulated contact block or strip 21, which, when the magnet 13 is energized, bridges two contacts 22 and 23 of a signal circuit 24.

The apparatus illustrated in Fig. 1 is designed primarily for cars passing in one direction only. It will be obvious, however, that it can be used for cars passing in both directions, but that the same signal will be given, regardless of the direction in which the car is going. To insure electrical connections of low resistance between the rails 10 and 8, and to enable the section 7 to be thoroughly insulated, the rail 10 is connected to the rail 8 by a second wire 25, and the parts of the rail 10 on each side of the section 7 are connected by a wire 26.

The apparatus illustrated in Figs. 2 and 3 is designed primarily for use on a track or section of track in which cars pass in both directions, and is arranged to close one signal circuit when a car passes in one direction, and to close another signal circuit when a car passes in the opposite direction. The essential novel features of this apparatus consist of two magnets which are energized successively by the passage of a car, and which are provided with armatures arranged to coöperate in closing a signal circuit, the energizing of but one magnet failing to close a signal circuit, and the successive energizing of both magnets being necessary to close the circuit. In the arrangement illustrated, the magnets when energized in one order close one signal circuit, and when energized in the reverse order, close another circuit. It will be obvious, however, that an apparatus embodying the principle of the apparatus illustrated in Fig. 2 might be used to close the same signal circuit for cars going in both directions, or might be used on a track or section of track in which cars pass in one direction only.

The two magnets of the apparatus illustrated in Fig. 2 are indicated at 27 and 28. Each of these magnets is included in a signal controlling circuit similar to that illustrated in Fig. 1, each circuit including contacts arranged to be closed by the trolley of an electric car and contacts arranged to be closed by the wheels of the car. The insulated rail section forming one of the contacts in the signal controlling circuit which includes the magnet 27 is indicated at 29, and the insulated rail section constituting one of the contacts of the other signal controlling circuit is indicated at 30. Each signal controlling circuit is also provided with means similar to those illustrated in Fig. 1 for shunting the contacts which are closed by the trolley.

It will be obvious from an inspection of Fig. 2 that the signal controlling circuits will be closed successively by the passage of a car in either direction, and that one magnet will be energized before the other is de-energized, since the insulated rail sections 29 and 30 are in such close proximity that the forward wheels of a car will pass on to one section before the rear wheels leave the other section. The armatures of the magnets 27 and 28 are engaged at 31 and 32. These armatures, as is clearly shown in Fig. 2, are so arranged that when they are drawn up successively their inner ends will overlap, the armature 31 being on top when the magnet 27 is first energized, and the armature 32 being on top when the magnet 28 is first energized. The armature 31 is provided at its inner end and upon its upper surface with insulated contact strips 33 and 34, and the armature 32 is provided with similar contact strips 35 and 36. The contact strips 33 and 35 are arranged to engage a contact 37, and the contact strips 34 and 36 are arranged to engage respectively contacts 38 and 39. The contact 37 is connected by a wire to the trolley wire and forms a portion of two signaling circuits, in one of which the contact 38 is included, and in the other of which the contact 39 is included. Upon the lower surfaces of the armatures 31 and 32, and at their inner ends, are provided insulated contact strips 40, 41, 42, and 43, electrically connected respectively to the contact strips 33, 34, 35, and 36. The contact strips on the lower surfaces of the armatures are arranged close together so that when the magnets are energized and the armatures actuated, the contact strips which are on the armature which is first actuated will be bridged by the contact strip on the upper suface and at the inner end of the other armature. The successive actuation of the armatures will therefore close one of the signal circuits, the circuit closed depending on which armature is first actuated, while the actuation of either armature alone will fail to close either signal circuit. Inasmuch as the armatures when attracted overlap, as illustrated in Fig. 3, and the armature which is underneath is actuated last, the upper armature will be supported after its magnet is deënergized, and the signal circuit will remain closed until the car or cars pass beyond both insulated sections of track.

In the apparatus illustrated in the drawing, and above described, each signal controlling circuit includes in series both the contacts which are closed by the trolley and the contacts which are closed by the wheels of the car. It is to be understood, however, that while this arrangement is preferred, other arrangements might be used without departing from the broad principle of this feature of the invention, and that broadly considered this feature of the invention contemplates the use of a signal controlling circuit which is closed either directly or indirectly by the closure of two sets of contacts bridged respectively by the trolley and wheels of an electric car. It is also to be understood that by the term "signal controlling circuit" is meant any circuit which controls either directly or indirectly the operations of a signal.

The nature and scope of the present invention having been indicated, and apparatus embodying the several features of the invention in their preferred form having been specifically described, what is claimed is:—

1. A signal controlling apparatus, having, in combination, contacts arranged to be closed by the trolley of an electric car, contacts arranged to be closed by the wheels of the car, and a signal controlling circuit closed by the closure of both sets of contacts.

2. A signal controlling apparatus, having, in combination, contacts arranged to be closed by the trolley of an electric car, contacts arranged to be closed by the wheels of the car, a signal controlling circuit closed by the closure of both sets of contacts, and means for maintaining the circuit closed after one set of contacts is opened.

3. A signal controlling apparatus, having, in combination, contacts arranged to be closed by the trolley of an electric car, contacts including an insulated section of rail arranged to be closed by the wheels of the car, and a signal controlling circuit closed by the closure of both sets of contacts.

4. A signal controlling apparatus, having, in combination, contacts arranged to be closed by the trolley of an electric car, contacts arranged to be closed by the wheels of a car, and a signal controlling circuit including both sets of contacts in series whereby the circuit is closed by the closure of both sets of contacts.

5. A signal controlling apparatus, having, in combination, contacts arranged to be closed by the trolley of an electric car, contacts including an insulated section of rail arranged to be closed by the wheels of a car, and a signal controlling circuit including both sets of contacts in series whereby the circuit is closed by the closure of both sets of contacts.

6. A signal controlling apparatus, having, in combination, contacts arranged to be closed by the trolley of an electric car, contacts including an insulated section of rail arranged to be closed by the wheels of a car, a signal controlling circuit including both sets of contacts in series, a magnet included in the circuit, and means acting when the magnet is energized to shunt the contacts which are closed by the trolley.

7. A signal controlling apparatus, having, in combination, two magnets, means to energize said magnets successively upon the passage of a car, and armatures for said magnets coöperating when the magnets are energized successively to close a signal circuit and to maintain said circuit closed after one of said magnets is deënergized.

8. A signal controlling apparatus, having, in combination, two magnets, means for energizing said magnets successively in one order when a car passes in one direction and for energizing said magnets in the reverse order when a car passes in the opposite direction, and armatures for said magnets coöperating when said magnets are energized successively in one order to close a signal circuit and when energized in the reverse order to close another signal circuit and to maintain said circuits closed after one of said magnets is deënergized.

9. A signal controlling apparatus, having, in combination, two magnets, means for energizing said magnets successively upon the passage of a car, and armatures for said magnets coöperating when the magnets are energized successively to close a signal circuit, said armatures being arranged to overlap whereby the armature of the magnet first energized is supported by the other armature.

10. A signal controlling apparatus, having, in combination, two magnets, means for energizing said magnets successively in one order when a car passes in one direction and for energizing said magnets in the reverse order when a car passes in the opposite direction, and armatures for said magnets coöperating when said magnets are energized successively in one order to close a signal circuit and when energized in the reverse order to close another signal circuit, said armatures being arranged to overlap whereby the armature of the magnet first energized is supported by the other armature.

11. A signal controlling apparatus, having, in combination, two magnets, means for energizing said magnets successively upon the passage of a car, and armatures for said magnets coöperating when the magnets are energized successively to close a signal circuit, one of said armatures being arranged to be supported by the other after its magnet is deënergized.

In testimony whereof I affix my signature, in presence of two witnesses.

WINTHROP M. CHAPMAN.

Witnesses:
  FRED O. FISH,
  M. L. GILMAN.